(12) United States Patent
Solihin

(10) Patent No.: US 10,445,131 B2
(45) Date of Patent: Oct. 15, 2019

(54) CORE PRIORITIZATION FOR HETEROGENEOUS ON-CHIP NETWORKS

(71) Applicant: EMPIRE TECHNOLOGY DEVELOPMENT LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 340 days.

(21) Appl. No.: 15/306,004

(22) PCT Filed: Apr. 24, 2014

(86) PCT No.: PCT/US2014/035360
§ 371 (c)(1),
(2) Date: Oct. 21, 2016

(87) PCT Pub. No.: WO2015/163897
PCT Pub. Date: Oct. 29, 2015

(65) Prior Publication Data
US 2017/0046198 A1    Feb. 16, 2017

(51) Int. Cl.
| | |
|---|---|
| *G06F 9/46* | (2006.01) |
| *G06F 9/48* | (2006.01) |
| *G06F 1/3234* | (2019.01) |
| *G06F 1/3296* | (2019.01) |
| *G06F 9/50* | (2006.01) |
| *G06F 9/455* | (2018.01) |

(52) U.S. Cl.
CPC .......... *G06F 9/4818* (2013.01); *G06F 1/3243* (2013.01); *G06F 1/3296* (2013.01); *G06F 9/505* (2013.01); *G06F 9/45558* (2013.01); *G06F 2009/45583* (2013.01); *Y02D 10/152* (2018.01); *Y02D 10/22* (2018.01); *Y02D 50/20* (2018.01)

(58) Field of Classification Search
CPC ..................................................... G06F 9/4818
See application file for complete search history.

(56) References Cited

U.S. PATENT DOCUMENTS

| | | |
|---|---|---|
| 2009/0138683 A1 | 5/2009 | Capps, Jr. et al. |
| 2009/0288092 A1 | 11/2009 | Yamaoka |
| 2011/0088041 A1 | 4/2011 | Alameldeen et al. |
| 2011/0119672 A1 | 5/2011 | Ramaraju et al. |
| 2011/0173414 A1 | 7/2011 | Juffa et al. |

(Continued)

OTHER PUBLICATIONS

ISRWO for PCT/US2014/035360 dated Sep. 15, 2014.

(Continued)

*Primary Examiner* — Bing Zhao

(57) ABSTRACT

A processor may comprise a plurality of cores operating at heterogeneous frequencies communicatively coupled by a network of routers also operating at heterogeneous frequencies. A core may be prioritized for thread execution based on operating frequencies of routers on a path from the core to a memory controller. Relatively higher priority may be assigned to cores having a path comprising only routers operating at a relatively higher frequency. A combined priority for thread execution may be based on core frequency, router frequency, and the frequency of routers on a path from the core to a memory controller. A core may be selected based primarily on core operating frequency when cache misses fall below a threshold value.

15 Claims, 10 Drawing Sheets

(56) References Cited

U.S. PATENT DOCUMENTS

2012/0159496 A1  6/2012  Dighe et al.
2013/0151879 A1  6/2013  Thomson et al.

OTHER PUBLICATIONS

Borkar, et al., "The Future of Microprocessors", Communications of the ACM, vol. 54, No. 5, pp. 67-77 (May 2011).
Matsutani, et al., "Adding Slow-Silent Virtual Channels for Low-Power On-Chip Networks", Second ACM/IEEE International Symposium on Networks-on-Chip, 2008. NoCS 2008, pp. 23-32 (Apr. 7-10, 2008).
Miller, et al., "Booster: Reactive Core Acceleration for Mitigating the Effects of Process Variation and Application Imbalance in Low-Voltage Chips", HPCA, pp. 1-12 (Feb. 2012).
Mishra, et al., "A Case for Dynamic Frequency Tuning in On-Chip Networks", Proceedings of the 42nd Annual IEEE/ACM International Symposium on Microarchitecture, pp. 292-303 (2009).

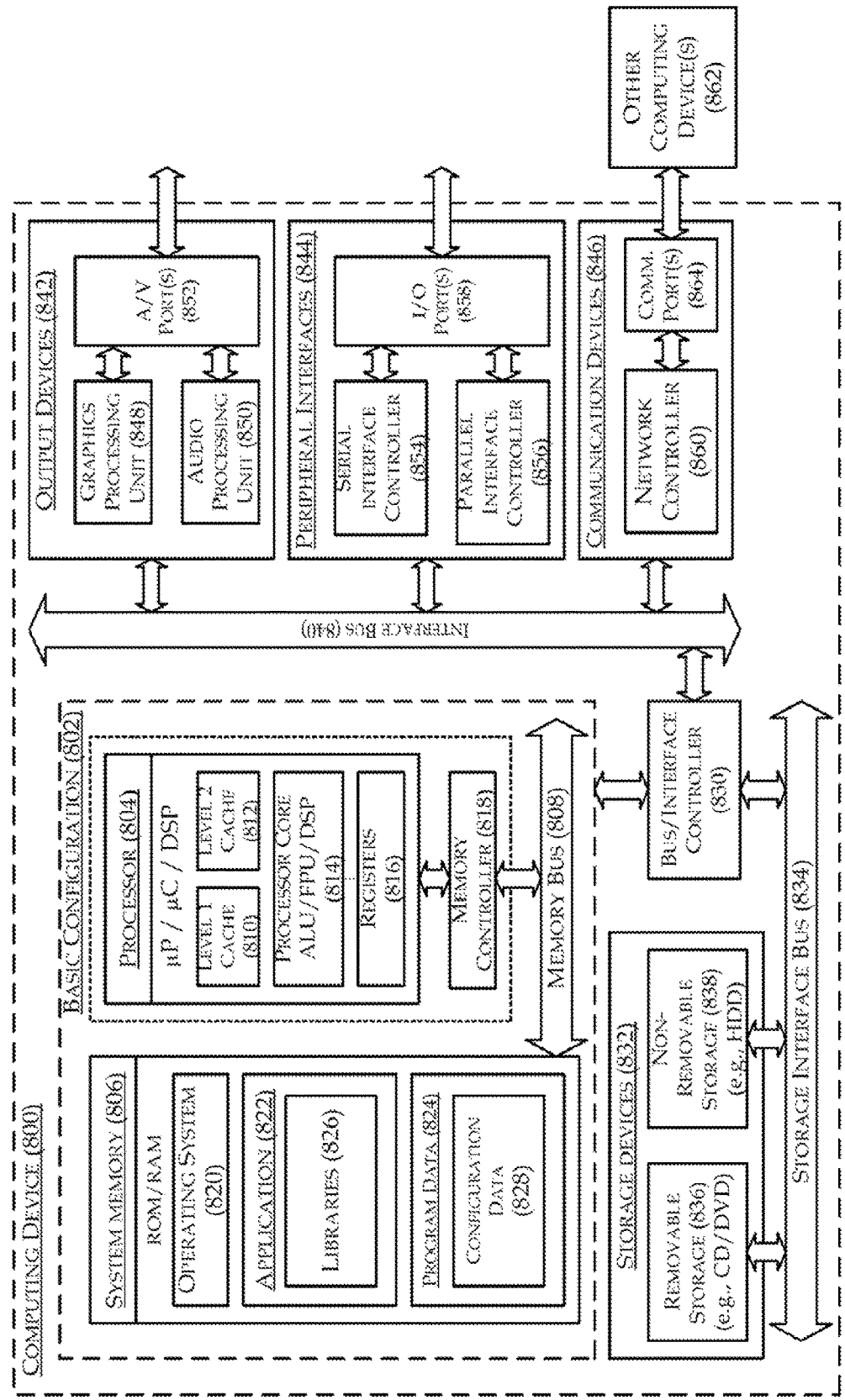

CORE PRIORITIZATION FOR HETEROGENEOUS ON-CHIP NETWORKS

CROSS-REFERENCE TO RELATED APPLICATION

This application is a U.S. National Stage filing under 35 U.S.C. § 371 of International Application No. PCT/US2014/035360, filed on Apr. 24, 2014 which application is incorporated herein by reference in its entirety, for any purpose.

BACKGROUND

Unless otherwise indicated herein, the materials described in this section are not prior art to the claims in this application and are not admitted to be prior art by inclusion in this section.

Power consumption by a multicore processor may be reduced by operating the cores at near-threshold voltages. In general, power consumption may be quadratically proportional to supply voltage and linearly proportional to clock frequency. Accordingly, reducing the supply voltage and corresponding clock frequency may reduce power consumption by a significant amount. However, due to manufacturing variations, there may be differences in the threshold voltages and maximum operable frequencies of the various cores of a multicore processor. A similar situation may exist regarding interconnected routers on a multicore processor, which may form components of a network on a chip ("NoC").

SUMMARY

Various techniques to determine core priority on multicore chips with heterogeneous core and router frequencies are disclosed. Embodiments may include prioritizing a core to execute a thread based on the operating frequencies of paths leading from the core to a memory controller. In various embodiments, a core may be prioritized to execute threads based on a path between the core and a memory controller comprising routers operating at a maximum frequency and excluding routers operating at less than maximum frequency. A core may be prioritized to power gate based on the operating frequencies of routers on a path between the core and a memory controller. Embodiments may also include using the cache miss rate for a thread to determine the use of router frequency and path priority over core frequency. Data steering may be applied to promote data storage on memory served by memory controllers associated with high priority paths.

The foregoing summary is illustrative only and should not be construed in any way to be limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8 is a block diagram depicting an example computing system wherein aspects of the present disclosure may be practiced.

Figure 1:
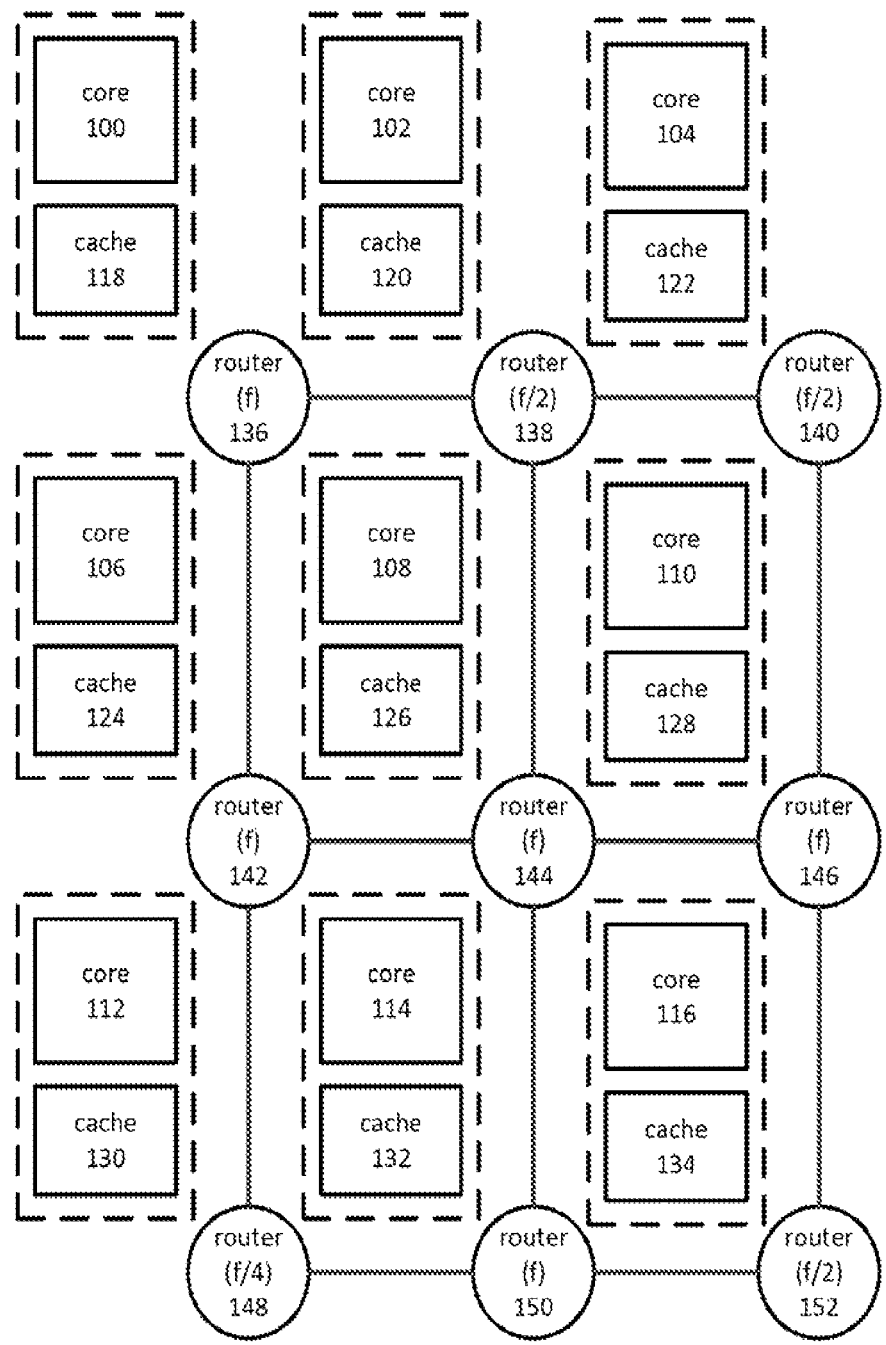
FIG. 1 is a block diagram depicting an embodiment of a multicore processor system having cores and routers operable at mixed frequencies and that employ core prioritization techniques consistent with aspects of the present disclosure.

All of the above are arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related, to prioritize cores for thread execution based on operating frequencies of routers communicatively coupling cores of a processor. For example, a component may be configured at least to identify a first core of the plurality of cores, wherein the identification of the first core is based at least in part on a first determination that there is at least one path between the first cote and at least one of the one or more memory controllers wherein all routers in the at least one path are operable at a first frequency. The component may be further configured at least to identify a second core of the plurality of cores, wherein the identification of the second core is based at least in part on a second determination that all paths between the second core and a memory controller of the at least one memory controller comprises at least one router with a maximum operable frequency less than the first frequency. The component may be further configured to assign a first thread to execute on the first core and to assign a second thread to execute on the second core based at least in part on a determination that the first core is unavailable to execute the second thread.

In another embodiment, a method may comprise identifying a first core of a plurality of cores of a processor, wherein the identification of the first core is based at least in part on a first determination that there is at least one path between the first core and at least one of one or more memory controllers wherein all routers in the at least one path are operable at a first frequency; and identifying a second core of the plurality of cores, wherein the identification of the second core is based at least in part on a second determination that all paths between the second core and a memory controller of the at least one memory controller comprise at least one router with a maximum operable frequency less than the first frequency.

In a further embodiment, a computer program product, such as a computer readable storage medium, may include computer readable instructions that, in response to execution by a computing device, cause the computing device to at least identify a first core of a plurality of cores, wherein the identification of the first core is based at least in part on a first determination that there is at least one path between the first core and at least one memory controller wherein all routers in the at least one path are operable at a first frequency. Executing the instructions may further cause to computing device to at least identify a second core of the plurality of cores, wherein the identification of the second core is based at least in part on a second determination that all paths between the second core and a memory controller of the at least one memory controller comprise at least one router with a maximum operable frequency less than the first frequency. Executing the instructions may further cause to computing device to at least and further to assign a first thread to execute on the first core and assign a second thread to execute on the second core based at least in part on a determination that the first core is unavailable to execute the second thread.

Briefly stated, a processor may comprise a plurality of cores operating as heterogeneous frequencies communicatively coupled by a network of routers also operating at heterogeneous frequencies. A core may be prioritized for thread execution based on operating frequencies of routers on a path from the core to a memory controller. Relatively higher priority may be assigned to cores having a path comprising only routers operating at a relatively higher frequency. A combined priority for thread execution may be based on core frequency, router frequency, and the frequency of routers on a path from the core to a memory controller. A core may be selected based primarily on core operating frequency when cache miss rates fall below a threshold value.

A significant consumer of energy in a multicore processor may be on-chip routers that are components of a network-on-a-chip ("NoC") used to facilitate communication between cores. The number of routers in a NoC may grow at a rate that is proportional or otherwise related to the square of (or other function or amount of) the number of cores. As the number of cores grows, the on-chip routers may consume an increasing percentage of the surface area of the chip and may become an increasingly significant consumer of power.

The cores of a multicore processor may be configured to operate at near-threshold voltages in order to improve energy efficiency. Manufacturing variations and other factors may cause the threshold voltage of the cores to vary. As a result, the maximum operable frequency of the cores may also vary. The maximum operable frequency at which a core can run may depend on voltage drive, e.g. the difference between supply voltage and threshold voltage. In some embodiments, cores of a multicore processor may be stepped to ran at various frequency levels, such as full-frequency, half-frequency, and quarter-frequency, for example. These frequencies may be, for example, designated as f, f/2, and f4, respectively. As used herein, a maximum operable frequency may refer to the maximum or otherwise relatively higher/high frequency at which a core may be configured to operate. Similarly, a minimum operable frequency may refer to the minimum or otherwise relatively lower/low frequencies at which a core may be configured to operate. In addition, the terms high, medium, low, highest, and lowest, as applied to operable frequencies, may refer to operable frequencies relative to a given configuration. Operable frequencies may be configured based on a wide variety of factors, including but not limited to physical characteristics, design goals, and other factors.

Routers in a NoC may also be configured to operate at near-threshold voltages in order to improve energy efficiency. In some cases, workloads executing on a multicore processor may have low NoC utilization for reasons such as low rates of cache misses or a low degree of sharing between cores. Such usage patterns may be consistent with operating NoC routers at near-threshold voltage. Note that if the cores are also configured to operate at near-threshold voltage, they may run at lower frequencies than super-threshold designs, further reducing NoC utilization.

In other cases, however, there may be high utilization of the NoC on a sustained or intermittent basis. In various cases, embodiments may operate at least some routers on the NoC at super-threshold voltages and higher frequencies than those routers operating at near-threshold voltages. In other cases, the routers may operate at near-threshold voltages. Embodiments may, however, still utilize heterogeneous operating frequencies for the routers in order to accommodate variations in threshold voltage. In some embodiments, separate NoCs for routers operating at super-threshold and near-threshold voltages may be interconnected and enabled on an as-needed basis.

FIG. 1 is a block diagram depicting an embodiment of a multicore processor system having cores and routers operable at mixed frequencies and that employ core prioritization techniques consistent with aspects of the present disclosure. More specifically, FIG. 1 depicts an example of a multicore processor with a NoC whose routers may operate at heterogeneous frequencies. Because of manufacturing variations and other factors, each multicore processor may have a different combination of threshold voltages and corresponding maximum operable frequencies. Accordingly, the configuration of heterogeneous frequencies depicted in FIG. 1 is illustrative of one possible configuration.

As depicted in FIG. 1, a multicore processor may comprise various cores 100-116 with corresponding caches 118-134. For example, core 100 may be associated with cache 118. One or more processors may be coupled to or otherwise associated with a router, such as router 136, which may be interconnected/coupled to other routers 138-152 to form elements of a NoC. A router, such as router 136, may communicatively couple a core, such as core 100, to a network such as the network topology shown in FIG. 1. The network topology depicted by FIG. 1 is for illustrative purposes and other network topologies are possible. For example, embodiments may employ any of various network topologies such as ring, mesh, torus, star, bus, hypercube, hybrid and so forth or combinations thereof. The various techniques employed herein may be applied to any network path between a core and a memory controller for which performance of the path might be potentially predominated by a single component in the path.

Routers on a multicore processor may operate at heterogeneous frequencies. As depicted in FIG. 1, routers 136, 142, 144, 146, and 150 may operate at a maximum operable frequency for routers in the NoC, designated as "f". Similarly, routers 138, 140, and 152 may be operable at half of the maximum operable frequency, designated as "f/2," and router 148 may be operable at no more than "f/4." The frequencies "f," "f/2," and "f/4" may be described as high, medium, and low operable frequencies relative to each other. In some embodiments, frequencies may be stepped in this manner due to various factors such as synchronization. However, alternative approaches to stepping, or the use of non-stepped frequencies, may be employed in conjunction with aspects of the present disclosure.

Note that the source of operating frequency variation may be due to variation in threshold voltage as opposed to supply voltage. As a result, a higher-frequency router may not necessarily be less energy efficient than a lower-frequency router. Embodiments may therefore include prioritization of higher-frequency routers over that of lower-frequency routers, without necessarily lessening energy efficiency. In some cases, embodiments may improve energy efficiency by prioritizing higher-frequency routers over lower-frequency routers.

Embodiments of the present disclose may be employed to manage traffic and power utilization of a NoC operating at heterogeneous frequencies, including a NoC configured to operate at near-threshold voltages. Embodiments may utilize core prioritization techniques for cores and NoCs configured to operate at near-threshold voltages. Priority for a core may be calculated based on the frequency of the router associated with the core and the minimum (or relatively lower) frequencies of routers forming a path from the core to a memory controller. Embodiments may schedule threads based on core priorities calculated according to the preceding example. Data steering techniques may also be employed to improve the performance benefits achievable through the core prioritization and thread scheduling techniques described herein.

Figure 2:
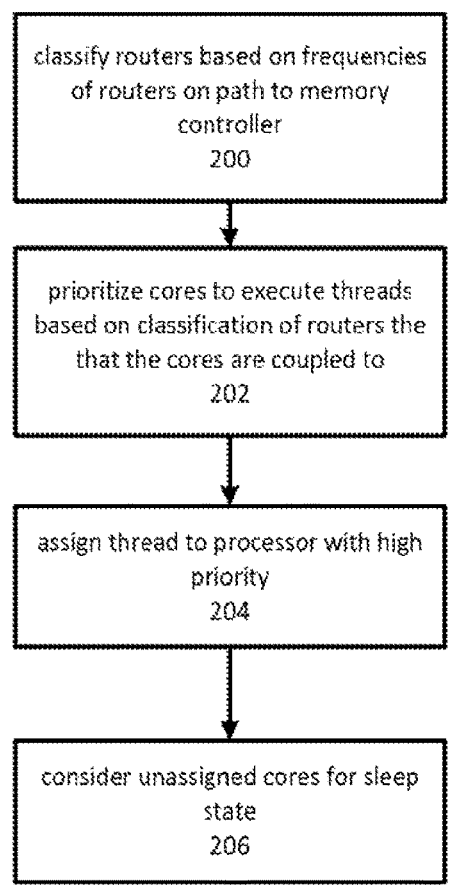
FIG. 2 is a flowchart an embodiment of a process to schedule threads on a multicore processor with a NoC comprising routers operable at heterogeneous frequencies.

FIG. 2 is a flowchart depicting an embodiment of a process to schedule threads on a multicore processor with a NoC comprising routers operable at heterogeneous frequencies. Although depicted as a series of operations, the depicted order of operations is intended to be illustrative, and in various embodiments, at least some of the depicted operations may be altered, omitted, reordered, supplemented with other operations, combined, and/or performed in parallel.

Block 200 ("classify routers based on frequencies of routers on path to memory controller") shows classifying a router based on the operating frequencies of the router and other routers on a path to a memory controller. For example, a scheduling component may classify a router as belonging to a particular frequency group if it operates at or above the corresponding frequency, and there exists a valid path between the router and a memory controller such that all intervening rooters also operate at or above that frequency.

A scheduling component may, in some embodiments include operating system components operable to cause threads to be executed on cores of a processor. A scheduling component may perform operations related to preemptive multitasking, context switching, resource management and so forth. A scheduling component may, in some embodiments, be formed by a combination of computer executable instructions and circuitry. Computer executable instructions for performing scheduling component operations may be implemented in whole or in part in operating system instructions, in processor microcode, in controller microcode, and so forth. In some embodiments, aspects of a scheduling component may be distributed between elements of a computing device, such as between code of an operating system and circuitry and microcode associated with a processor. In some embodiments, a processor may collect information relevant to scheduling decisions and transmit the information to, or otherwise make the information available to, an operating system. In other embodiments, scheduling decisions may be made by on-chip components of the processor.

At block 202 ("prioritize cores to execute threads based on classification of routers that the cores are coupled to"), which may follow block 200, a scheduling component may assign a priority to each core based on the classification of a rooter to which it may be coupled. For example, a scheduling component may give a high priority to a core that may be associated with a router classified as belonging to a maximum-frequency group, while cores associated with a router assigned to a medium-frequency group could be given medium priority. Embodiments may also consider the maximum operable frequency of a core when assigning priority. Next, at block 204 ("assign thread to processor with high priority"), which may follow block 202, the scheduling component may assign a thread to an available core with the high priority.

The aforementioned prioritization rules may also be described as follows: a core may be assigned a priority based on the maximum operable frequencies of routers that couple the core to a memory controller. When at least one path between the core and at least one memory controller comprises only of routers operating at a maximum frequency, the core may be assigned a high priority level. When at least one path between the core and at least one memory controller comprises entirely of routers operating at or better than medium frequency, the core may be assigned medium priority. Cores not classified as high or medium priority may be given low priority.

In some cases and embodiments, a scheduling component may consider transitioning unassigned cores to a sleep state, sometimes referred to as power gating. This is depicted by block 206 ("consider unassigned cores for sleep state"). In some embodiments, the scheduling component may select cores categorized as having lower priority to power gate over cores categorized as a having a higher priority.

Figure 3A:
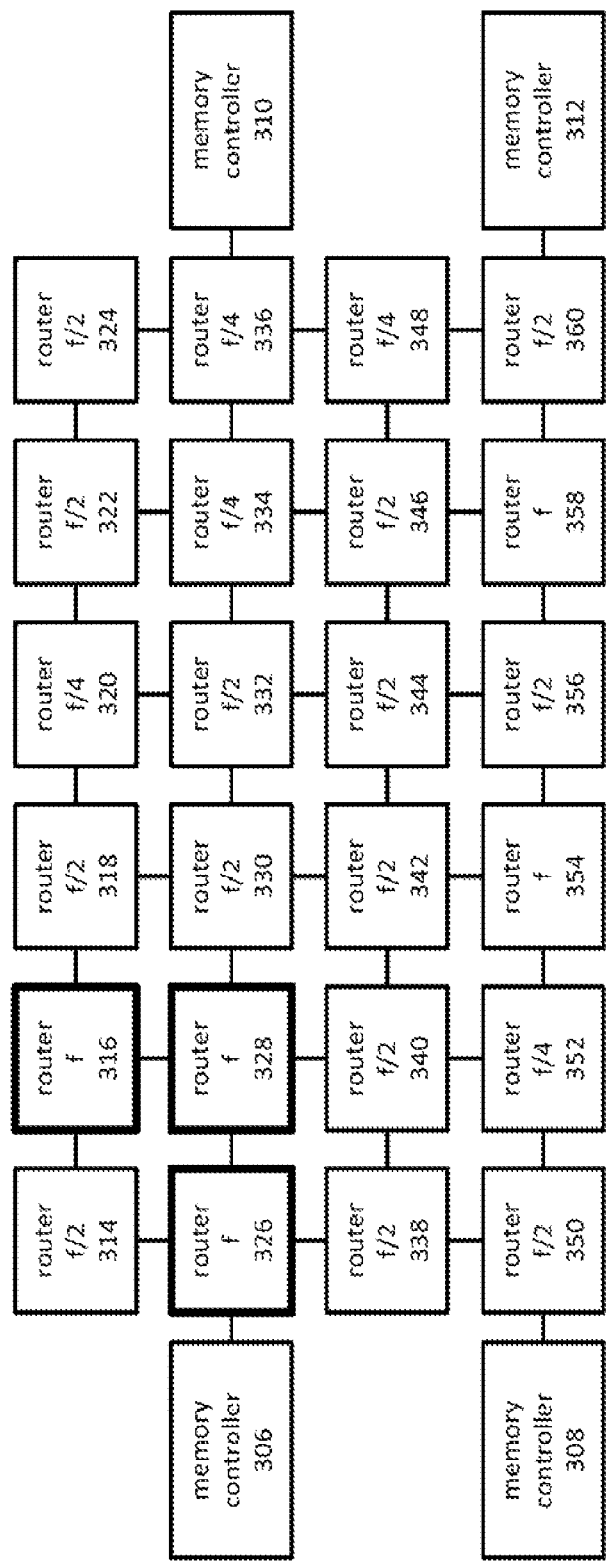
FIG. 3A is a block diagram depicting prioritization techniques on a system comprising a NoC operable with heterogeneous router frequencies, the prioritization based on a path between a core and a memory controller comprising routers operable at least at a high frequency.
Figure 3B:
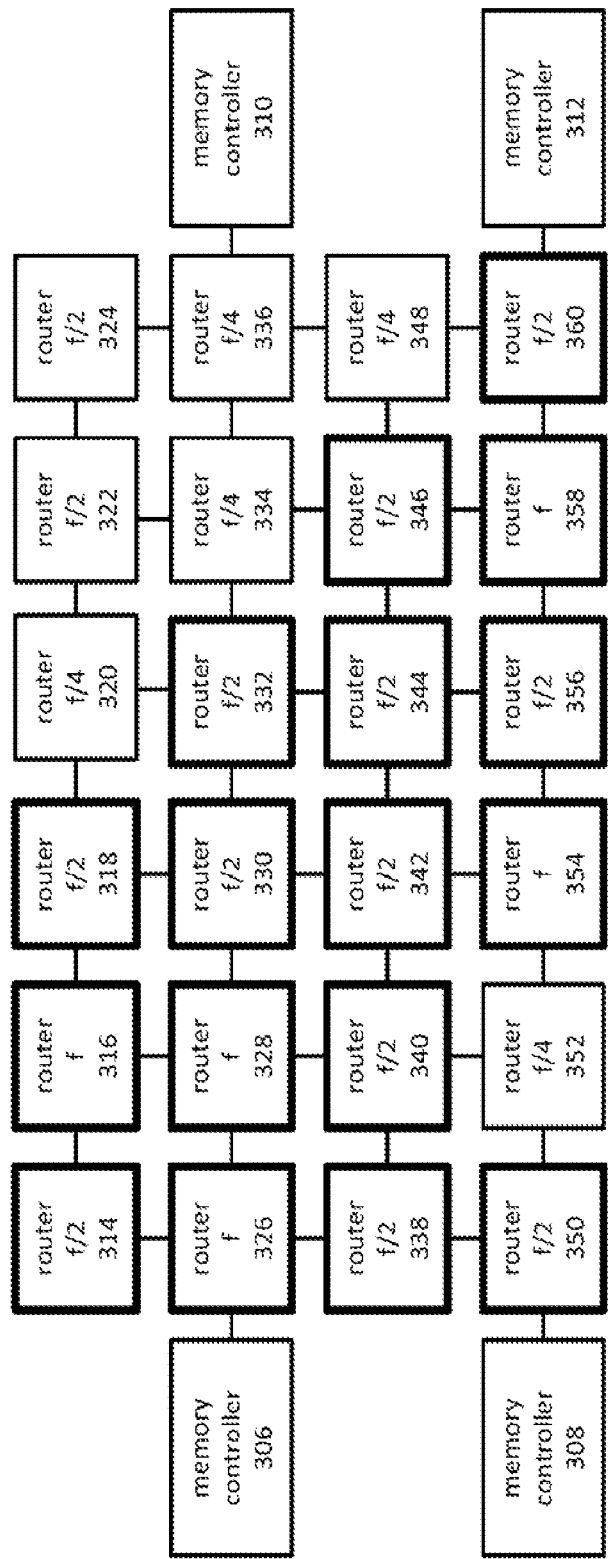
FIG. 3B is a block diagram depicting prioritization techniques on a system comprising a NoC operable with heterogeneous router frequencies, the prioritization based on a path between a core and a memory controller comprising routers operable at medium and high frequencies.
Figure 3C:
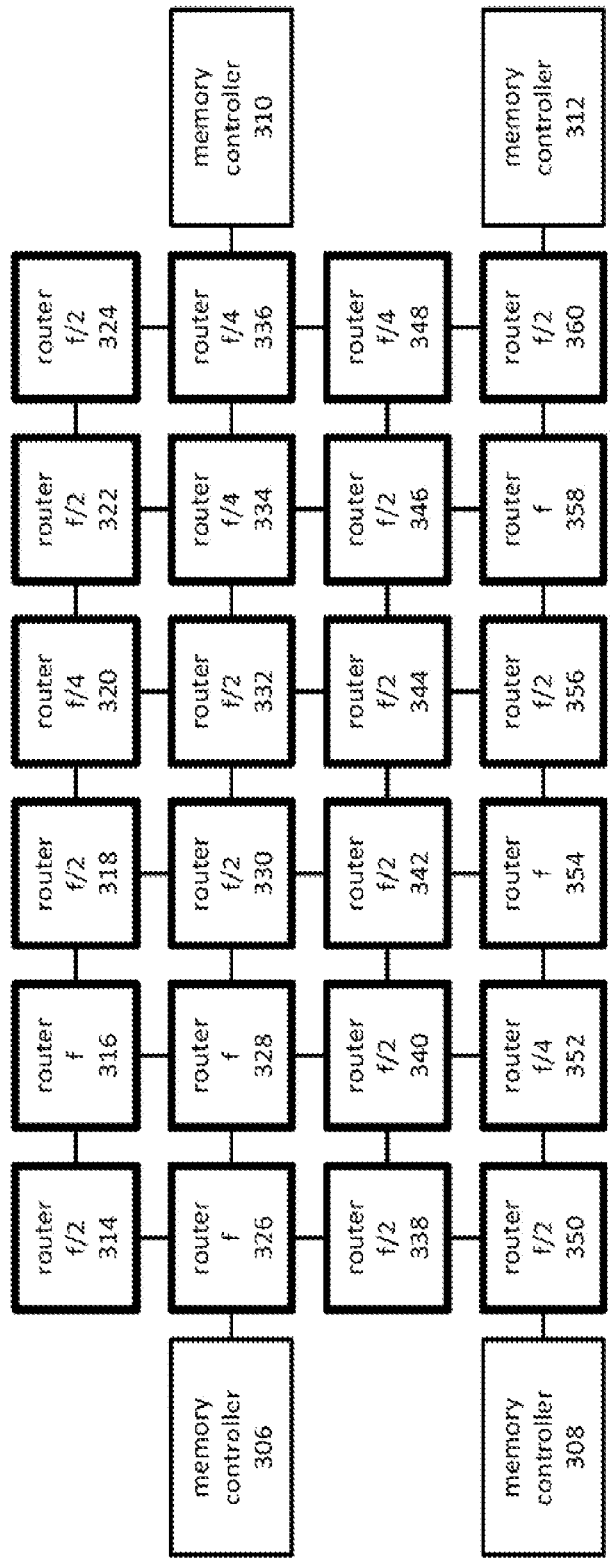
FIG. 3C is a block diagram depicting prioritization techniques on a system comprising a NoC operable with heterogeneous router frequencies, the prioritization based on a path between a core and a memory controller comprising at least one router operable at low frequency.

As depicted by block 202, a scheduling component may assign priority ratings to cores based on a classification of the routers to which the cores are connected to. FIGS. 3A, 3B, and 3C depict examples of classifying routers based on the respective router's maximum operable frequency. FIG. 3A is a block diagram depicting prioritization techniques on a system comprising a NoC operable with heterogeneous router frequencies, the prioritization based on a path between a core and a memory controller comprising routers operable at least at a high frequency. More specifically, FIG. 3A depicts a NoC comprising routers 314-360 and memory controllers 306, 308, 310, and 312 coupled in a lattice configuration. Although the depicted network utilizes a lattice configuration, various other network configurations may be utilized. Routers 316, 326, 328, 354, and 358 may be operable up to a maximum frequency designated as "f." A second set of routers may be operable up to a frequency of "f/2," and a third set may be operable up to a frequency of "f/4." A router, such as router 316, may be assigned a priority rating based on its own maximum operable frequency as well as the maximum operable frequency of intervening routers on a path to a memory controller.

Using FIG. 3A as an example, a scheduling component may classify routers 316, 326, and 328 as high priority routers. Using router 316 as an example, it may be classified as high priority based on there being a path from it to at least one memory controller—in this case memory controller 306—that contains only routers also operating at maximum frequency "f." Although router 358 also operates at maximum operable frequency "f," an embodiment would not classify it as high priority because each path from it to a memory controller also contains routers operating at a lesser frequency. For example, a path from router 358 to memory controller 312 also includes router 360 operating at a maximum frequency of "f/2."

FIG. 3B is a block diagram depicting prioritization techniques on a system comprising a NoC operable with heterogeneous router frequencies, the prioritization based on a path between a core and a memory controller comprising routers operable at medium and high frequencies. FIG. 3B depicts routers that may be classified by a scheduling component as belonging to a medium priority. Router 356, for example, could be classified as medium priority because no path between it and a memory controller comprises only of routers operating at frequency "f." Router 356 operates at frequency "f/2," and moreover all of the paths between it and memory controller 312 comprises of routers operating at frequencies "f" and "f/2." A medium priority path may be so designated based on such path comprising only routers operating at high frequency and medium frequency, including at least one router operating at medium frequency.

FIG. 3C is a block diagram depicting prioritization techniques on a system comprising a NoC operable with heterogeneous router frequencies, the prioritization based on a path between a core and a memory controller comprising at least one router operable at low frequency. In FIG. 3C, any of the depicted routers could be classified by a scheduling component as belonging to a low priority. For example, router 324 could be classified as low-priority because every path between it and a memory controller involves at least one router operating at "f/4." Some embodiments could classify routers such as router 314 as either medium priority or low priority. Similarly, referring again to FIG. 3B, some embodiments could classify routers 316, 326 and 328 as belonging to low priority, medium priority or high priority. Embodiments might assign a router to a lower priority based on various additional factors such as the frequency of the core that corresponds to the router, cache miss rates and so forth.

Figure 4:
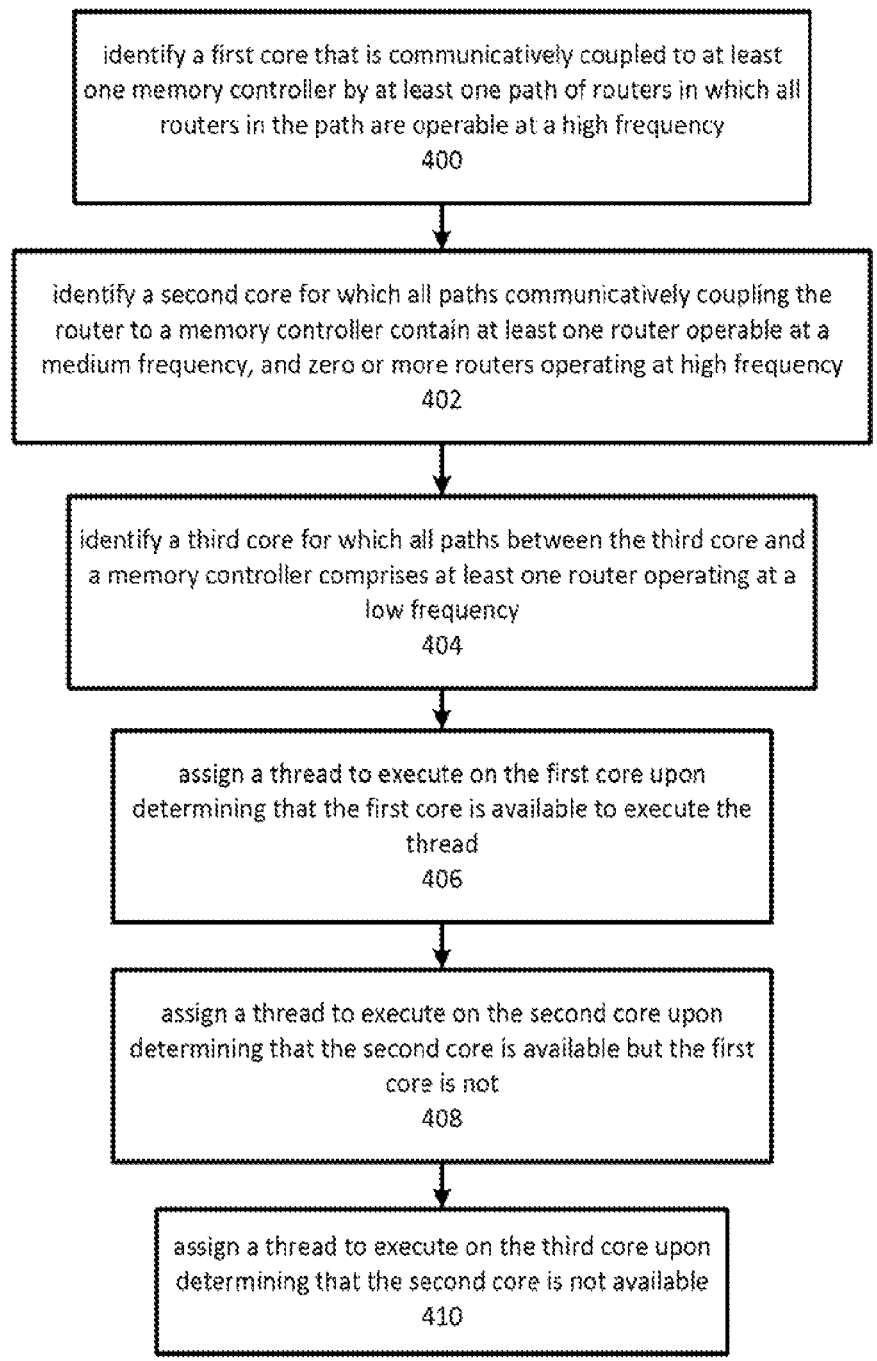
FIG. 4 is a flowchart depicting an embodiment of a process to perform core prioritization on a multicore processor comprising a NoC with routers operable at heterogeneous frequencies.

FIG. 4 is a flowchart depicting an embodiment of a process to perform core prioritization on a multicore processor comprising a NoC with routers operable at heterogeneous frequencies. More specifically, FIG. 4 describes an embodiment of a process to perform core prioritization on a multicore processor comprising a plurality of cores, a plurality of routers, and one or more memory controllers communicatively coupled to the cores by the routers. The plurality of cores may have heterogeneous maximum operable frequencies, as may the plurality of routers. Although FIG. 4 is depicted as a sequence of operations, the operations depicted in FIG. 4 may be performed in an order other than the depicted order. In addition, the depicted operations may be altered, omitted, supplemented with other operations, combined, or performed in parallel.

Block 400 ("identify a first core that is communicatively coupled to at least one memory controller by at least one path of routers in which all routers in the path are operable at a high frequency") depicts identifying, by a scheduling component, a first core that is communicatively coupled to at least one memory controller by at least one path of routers in which all routers in the path are operable at a high frequency. This may comprise identifying a first core of a processor, wherein the identification of the first core may be based at least in part on a determination that there is at least one path between the first core and at least one memory controller, wherein all routers in the at least one path are operable at a first frequency, which may be a relatively high frequency.

A core may be communicatively coupled by a plurality of paths in a network of interconnected routers. Some of these paths that communicatively couple a core to a memory controller may comprise only routers operable at a high frequency relative to other routers in a NoC, such as a maximum frequency "f" of routers in the NoC. Embodiments may associate the first core with a high priority regarding thread scheduling, or with a low priority regarding power gating.

Block 402 ("identify a second core for which all paths communicatively coupling the router to a memory controller contain at least one router operable at a medium frequency, and zero or more routers operating at high frequency"), which may follow block 400, depicts a scheduling component identifying a second core for which all paths communicatively coupling the router to a memory controller contain at least one router operable at a medium frequency, and zero or more routers operating at high frequency. This may comprise a scheduling component that identifies a second core of a processor, where the identification of the second core is based at least in part on determining that all paths between the second core and a memory controller comprise at least one router with a maximum operable frequency less than the first, relatively high, frequency.

Embodiments may, having determined that a core does not have a path between it and at least one memory controller comprising only of routers operable at maximum frequency "f," determine if a path may be found in which all of the routers are operable at least at a medium frequency such as "f/2." If such a path exists, embodiments may associate the second core with a medium priority regarding thread scheduling, or with a medium priority regarding power gating.

Block 404 ("identify a third core for which all paths between the third core and a memory controller comprises at least one router operating at a low frequency"), which may follow block 402, depicts a scheduling component identifying a third core for which all paths between the third core and a memory controller comprises at least one router operating at a low frequency. Embodiments may, for example, determine that all paths between the third core and any memory control contain at least one router operable at a low frequency such as "f/4." Embodiments may associate the third core with a low priority regarding thread scheduling, or with a high priority regarding power gating.

Block 406 ("assign a thread to execute on the first core upon determining that the first core is available to execute the thread"), which may follow block 404, depicts a scheduling component, assigning a thread to execute on the first core in response to determining that the first core, having been associated with a high priority regarding thread scheduling, is available to execute the thread. Similarly, block 408 ("assign a thread to execute on the second core upon determining that the second core is available but the first core is not"), which may follow block 406, depicts a scheduling component assigning a thread to execute on the second, core, the second core having been associated with medium priority, in response to determining that the second core is available to execute the thread and that no high priority thread is available to execute the thread. Block 410 ("assign a thread to execute on the third core upon determining that the second core is not available"), which may follow block 408, depicts a scheduling component assigning the thread to execute on the third core, having associated the third core with a medium priority, when no higher priority cores are available.

As used herein, assigning a thread for execution on a core may include causing instructions associated with the thread to be executed by the core. Assigning a thread for execution may be referred to as scheduling the thread for execution. Executing a thread may include performing computer-executable instructions. A thread may be associated with various characteristics that, in some embodiments, may be used in conjunction with other aspects of the present disclosure to assign the thread to a core for execution. For example, a thread may be associated with a cache miss rate that is indicative of how often memory used by the thread is available in cache.

The core prioritization method depicted by FIG. 4 may be altered or extended to form numerous variations and alternative embodiments. For example, the depicted method may be readily adapted to core frequencies that are continuous rather than stepped, or to more or fewer frequency steps. Some embodiments may utilize more or fewer priority levels, such as "high" and "low" in place of "high," "medium," and "low."

Figure 5:
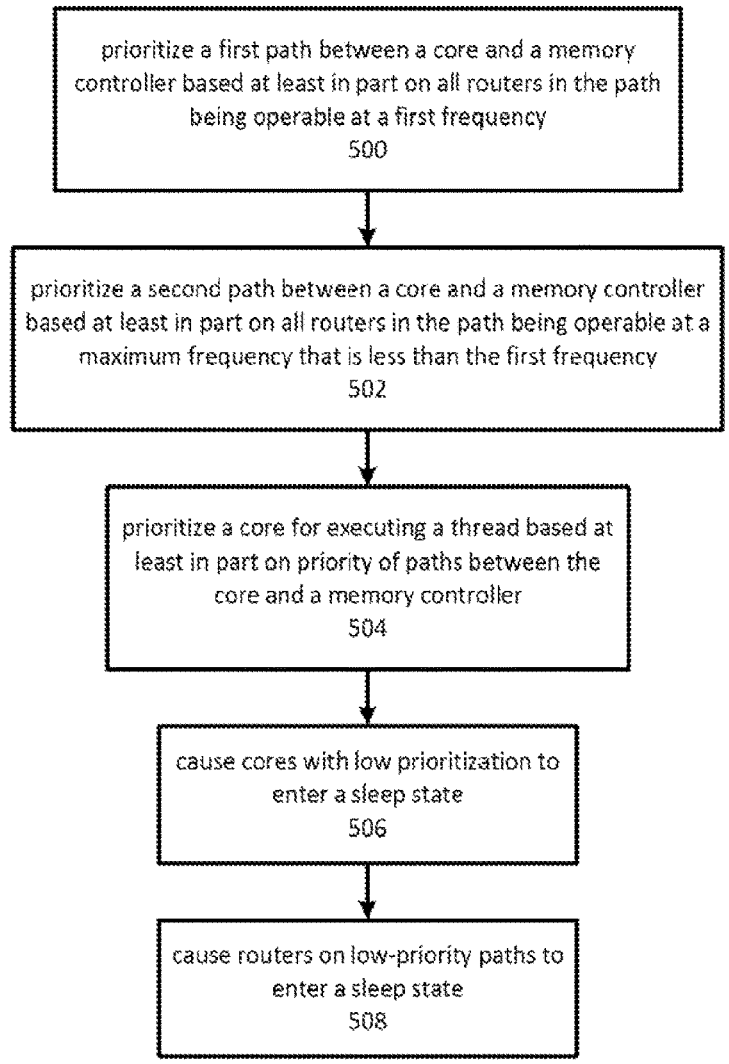
FIG. 5 is a flowchart depicting an embodiment of a process to perform core prioritization based on router frequencies and to perform power gating based on the core prioritization.

Core prioritization may be applied to power gating and other energy conservation methods. FIG. 5 is a flowchart depicting an embodiment of a process to perform core prioritization based on router frequencies and to perform power gating based on the core prioritization. For instance, FIG. 5 depicts an embodiment of a process for applying core prioritization, based on factors such as router operating frequency, to power gate components of a processor. In general terms, cores or routers may be prioritized to power gate based on the inverse of priority for executing threads.

Although FIG. 5 is depicted as a sequence of operations, the operations depicted by FIG. 5 may be performed in an order other than the depicted order. In addition, the depicted operations may be altered, omitted, supplemented with other operations, combined, or performed in parallel.

As depicted by block 500 ("prioritize a first path between a core and a memory controller based at least in part on ail routers in the path being operable at a first frequency"), embodiments may prioritize a first path between a core and a memory controller based at least in part on all routers in the path being operable at a first frequency. A scheduling component may, for example, associate a high priority with a path between a core and a memory controller in response to determining that all routers in the path are operable at a maximum frequency "f." Block 502 ("prioritize a second path between a core and a memory controller based at least in part on all routers in the path being operable at a maximum frequency that is less than the first frequency"), which may follow block 500, depicts a scheduling component prioritizing a second path based at least in part on all or some of the routers in the second path being operable at a maximum frequency that is less than the first frequency. For example, embodiments might assign medium priority to a path in which ail of the rooters are operable at a maximum frequency "f" except one, which is operable at no higher than frequency "f/2."

Block 504 ("prioritize a core for executing a thread based at least in part on priority of paths between the core and a memory controller"), which may follow block 502 depicts a scheduling component prioritizing a core for executing a thread based at least in part on the priority of paths between the core and a memory controller. Embodiments may, for example, assign a high priority for executing threads to a core based on the priorities of the paths from the core to a memory controller.

In some embodiments, a scheduling component may, as depicted by block 506 ("cause cores with low prioritization to enter a sleep state"), cause cores with low priority to enter a sleep state. Block 506 may follow block 504. This may be done to preserve energy consumption of the processor. As depicted by operation 508 (cause routers on low-priority paths to enter a sleep state"), embodiments may cause routers on lower priority paths to enter a sleep state, which may result in a reduction of energy consumption while routers associated with higher priority paths remain open.

Figure 6:
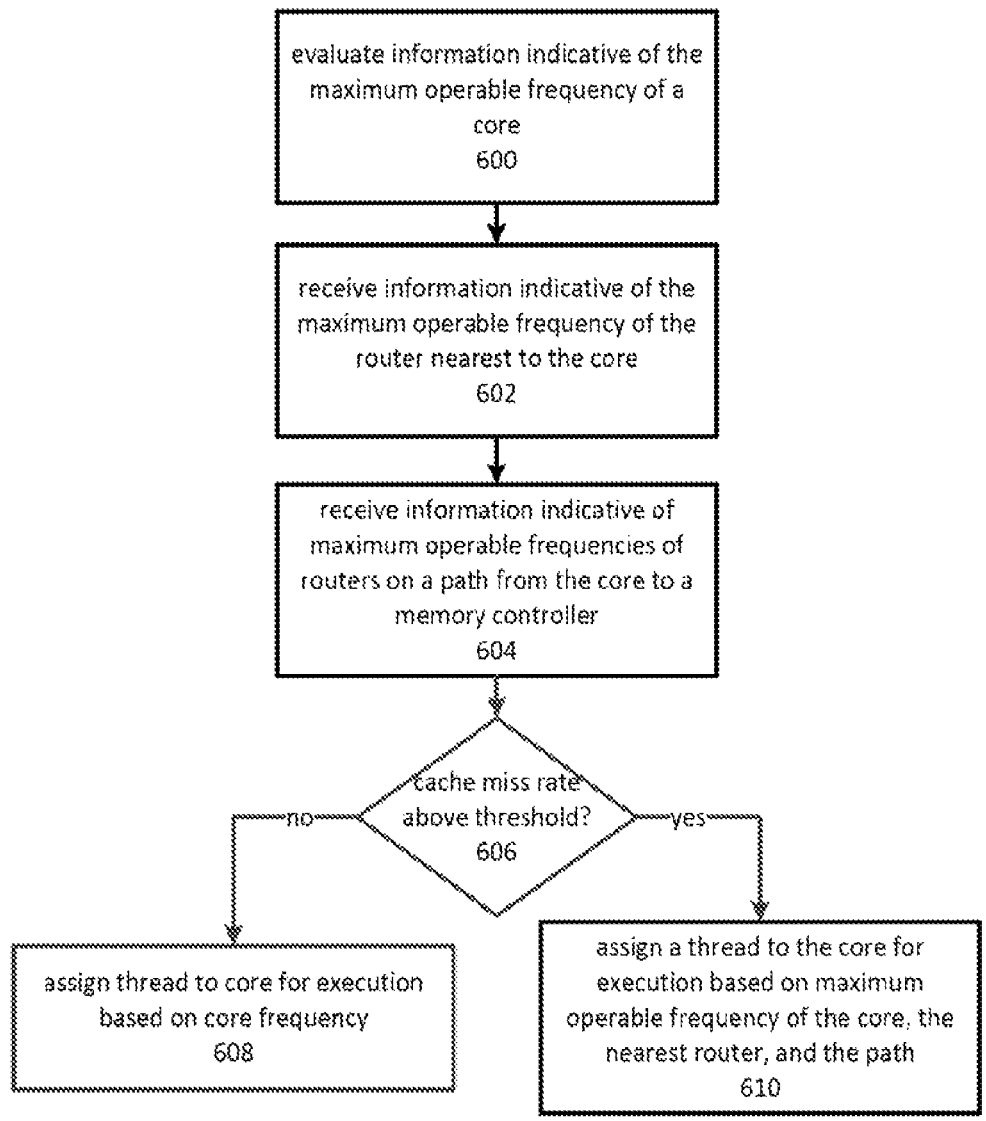
FIG. 6 is a flowchart depicting an embodiment of a process to perform core prioritization on a multiprocessor with cores and routers operable at heterogeneous frequencies, based on a combined prioritization value and cache miss rate for a thread to be scheduled for execution.

In various cases and embodiments, cache miss rates may be factored (by a scheduling component, for example) into thread scheduling decisions in combination with various core prioritization techniques described herein. Embodiments may assign (by a scheduling component, for example) threads to cores for execution based on core frequency when a cache miss rate is below a threshold value and on prioritization based on router frequency when a cache miss rate is above a threshold value. A threshold value may be based on experimental data or other factors, and may reflect an inflection point at which core frequency becomes predominate over core frequency in determining desired performance characteristics. FIG. 6 is a flowchart depicting an embodiment of a process to perform core prioritization on a multiprocessor with cores and routers operable at heterogeneous frequencies, based on a combined prioritization value and cache miss rate for a thread to be scheduled for execution. More particularly, FIG. 6 depicts an embodiment of a process for core prioritization based on cache miss rate, core frequency, and router frequency. Although depicted as a sequence of operations, the operations depicted in FIG. 6 may be performed in an order other than the depicted order. In addition, the depicted operations may be altered, omitted, supplemented with other operations, combined, or performed in parallel.

Block 600 ("evaluate information indicative of the maximum operable frequency of a core") depicts a scheduling component receiving and/or evaluating information, indicative of the maximum operable frequency of a core. In various embodiments, the maximum operable frequency may be a maximum frequency at which a core may be operable under a given set of constraints. This may, for example, include supply voltage and a threshold voltage associated with the core, which may vary based on manufacturing deviations and other factors. Information indicative of the maximum operable frequency of the core may be received from various memories, such as a memory located on the microprocessor or a memory on a connected computing system or device. Embodiments may receive or form a representation of core frequency corresponding to a standardized priority metric. For example, cores operable at a maximum frequency of "f" may be assigned a core frequency value of 1, those with "f/2" a value of 2, and those with "f/4" a value of 3.

Block 602 ("receive information indicative of the maximum operable frequency of the router nearest to the core"), which may follow block 600, depicts a scheduling component receiving information indicative of the maximum operable frequency of the router directly coupled or nearest to the core. As used herein, a router nearest to the core may include a router that is directly coupled to the core, and which may serve to communicatively couple the core to the NoC. Embodiments may receive the information indicative of the maximum operable frequency of the nearest router from a memory, in a manner similar to retrieving core information. Embodiments may receive or form a representation of router frequency corresponding to a standardized priority metric. For example, routers operable at a maximum frequency of "f" may be assigned a standardized priority metric value of 1, those with "f/2" a value of 2, and those with "f/4" a value of 3. Various alternative approaches to normalizing prioritization values, such as router operating frequency, may also be employed.

Block 604 ("receive information indicative of maximum operable frequencies of routers on a path from the core to a memory controller"), which follows block 602, depicts a scheduling component receiving information indicative of maximum operable frequencies of routers on a path from the core to a memory controller. Embodiments may receive this information from a memory, such as those used in conjunction with cores or individual routers. Embodiments may receive or form a representation of path priority values. For example, a path priority value for the core may be assigned a standardized priority metric value of 1 in response to determining that at least one path exists from the core to at least one memory controller in which all routers are operable at a maximum frequency of "f." Similarly, a value of 2 may be assigned in response to determining that, while no path consists entirely of routers operable at "f," at least one path exists in which the routers are operable at least at "f/2."

An overall core priority value may be calculated as the minimum value (or otherwise lower relative value) of some or all of the values calculated in operations 600 to 604. For example, an overall rating might be calculated as minimum (C, R, P), where C corresponds to core frequency, R to router frequency, and P to path rating. Each value may be represented using a standardized priority metric such as those described above, such that highest-priority ratings correspond to the lowest numerical values and the lowest-priority ratings correspond to the highest numerical values. This technique for calculating an overall core priority value is intended to be illustrative. Other possible approaches may include normalization and weighting of various factors. Embodiments may employ variable weighting to reflect the relative importance of each prioritization factor.

Embodiments may assign threads for execution based on overall core priority values. In some embodiments, factors such as a cache miss rate may also be included in assigning threads for execution. Block 606 ("cache miss rate above threshold?"), which may follow block 604, depicts a scheduling component determining whether a cache miss rate for a thread is above or below a threshold value. Where cache miss rate for a thread is low, performance may be influenced primarily by core frequency as opposed to router or path priority. Accordingly, when a thread's cache miss rate is below a threshold, a scheduling component may assign the thread to a core for execution based primarily on core frequency. This is depicted by block 608 ("assign thread to core for execution based on core frequency"), which may follow block 606 in response to a cache miss rate being below a threshold. When a thread's cache miss rate is above a threshold, the scheduling component may assign the thread to a core for execution, based on the maximum operable frequency of the core, the directly-coupled router, and the path priority. This is depicted by block 610 ("assign a thread to the core for execution based on maximum operable frequency of the core, the nearest router, and the path"), which may follow block 606 when a cache miss rate is above a threshold. In some embodiments, a scheduling component may utilize a core priority rating, such as minimum (C, R, P), that is indicative of a plurality of factors that may influence core selection.

The method depicted by FIG. 6 is intended to be illustrative of applying an overall core priority rating to thread scheduling techniques. Embodiments may, as indicated above, incorporate cache miss rates into applying an overall core priority rating. Various alternative embodiments of the approach described by FIG. 6 may include techniques such as employing a weighting factor that causes the influence of core frequency to increase as a thread's cache miss rate decreases.

Figure 7:
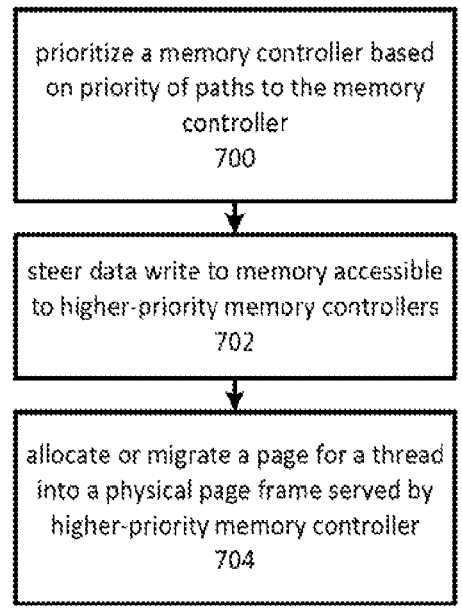
FIG. 7 is a flowchart depicting an embodiment of a process to employ data steering techniques in conjunction with core prioritization techniques consistent with the present disclosure.

FIG. 7 is a flowchart depicting an embodiment of a process to employ data steering techniques in conjunction with core prioritization techniques consistent with the present disclosure. Embodiments may, as depicted by FIG. 7, employ data steering in conjunction with other aspect of the present disclosure. Although depicted as a sequence of operations, the operations depicted in FIG. 7 may be performed in an order other than the depicted order. In addition, the depicted operations may be altered, omitted, supplemented with other operations, combined, or performed in parallel.

As depicted by block 700 ("prioritize a memory controller based on priority of paths to the memory controller"), a scheduling component may prioritize a memory controller based on the priority of paths to the memory controller. In other words, memory controllers connected to higher-priority paths may be given higher priority. Priority for a memory controller may be relative to a particular core, and in such cases may be calculated based on paths between the core and the memory controller.

Block 702 ("steer data write to memory accessible to higher-priority memory controllers"), which may follow block 700, depicts a scheduling component steering data writes to memory accessible to memory controllers with higher priority relative to other memory controllers. Data steering may comprise various techniques that increase the likelihood that data will be retrievable by a high-priority path from a core to a memory controller. For example, as depicted by block 704 ("allocate or migrate a page for a thread into a physical page frame served by prioritized memory controller"), a scheduling component may allocate a page or migrate an existing page, for a thread into a physical page frame served by a high-priority memory controller, where priority of the memory controller may be determined as described by block 700. Block 704 may follow block 702. In an embodiment, data steering may be performed by associating memory for at thread with a physical page frame served by a memory controller, where the memory controller is selected based at least partly on there being a path between the memory controller and a core where all routers are operable at a relatively high frequency.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more processors), as firmware, or as virtually any combination thereof and that designing the circuitry and/or writing the code for the software and or firmware are possible in light of this disclosure. In addition, those the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, and a transmission type medium such as a digital and/or an analog communication medium (e.g., a fiber optic cable, a waveguide, a wired communications link, a wireless communication link, etc.).

Those skilled in tire art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system may generally include one or more of a system unit housing, a video display device, a memory such as volatile and non-volatile memory, processors such as processors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, other different components. Such depicted architectures are merely examples, and, in fact, many other architectures can be implemented to achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected"—or "operably coupled"—to each other to achieve the desired functionality, and any two components capable of being so associated can also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

FIG. 8 is a block diagram depicting an example computing system wherein aspects of the present disclosure can be implemented. In particular, FIG. 8 depicts a block diagram illustrating an example computing device 800 that is arranged for providing functionality and features in accordance with the present disclosure. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP core), or any combination thereof. An example memory controller 818 may also be used with processor 804, or in some implementations memory controller 818 may be an internal part of processor 804.

Processor 804 may be a multi-core processor. A multicore processor 804 may comprise a plurality of processor cores 814, each paired with one of a plurality of level 1 cache 810 and registers 816. The plurality of processor cores 814 may, in some embodiments, share level 2 cache 812 and one or more memory controllers 818. Numerous alternative configurations and combinations may be utilized in conjunction with the practice of various aspects of the present disclosure.

A multi-core embodiment of processor 804 may comprise various network components that may be used to interconnect various elements of processor 804, such as processor core 814 and memory controller 818. The various network components may include routers, bridges, switches, and other components. The various network components may be referred to herein as routers. In some embodiments, elements such as bridges and switches may be combined to form a unit which may also be referred to herein as a router.

Various aspects of the present disclosure may be practiced by memory controller 818, operating system 820, other software instruction or circuitry components, and various combinations of the preceding. Instructions to perform aspects of the present disclosure may be stored in a memory communicatively coupled to processor 804, memory controller 818, or other elements of processor 804. In some embodiments, a memory containing information indicative of core operating frequencies, router operating frequency, or similar information may be stored in a memory associated with processor 804. Instructions to perform various aspects of the present disclosure may be embodied by computer executable instructions stored on a non-transitory computer readable storage media such as any of storages devices 832. In some embodiments, processor 804 may contain storage media containing executable instructions for practicing aspects of the present disclosure, with the storage media including, for example, circuitry containing microcode instructions.

Depending on the desired configuration, system memory 806 may be of any type including but not limited to volatile memory (such as RAM), non-volatile memory (such as ROM, flash memory, etc.), or any combination thereof. System memory 806 may include an operating system 820, one or more applications 822, and program data 824. Application 822 may include libraries 826 that are arranged to perform various functions or operations. Program data 824 may include configuration data 828 that may, for example, be used to modify aspects of behavior pertaining to operating system 820 or applications 822. In some embodiments, application 822 may be arranged to operate with program data 824 on operating system 820. In some embodiments, application 822 may in whole or in part be used to implement at least some portion of a scheduling component as described above. This described basic configuration 802 is illustrated in FIG. 8 by those components within the inner dashed line.

Computing device 800 may have additional features or functionality and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital, versatile disk (DVD) drives, solid state drives (SSDs), and tape drives to name a few. Example computer storage media may include volatile and nonvolatile and removable and non-removable media implemented in any method or technology for storage of information, such as computer readable instructions, data structures, program modules, or other data.

System memory 806, removable storage devices 836, and non-removable storage devices 838 are examples of computer storage media. Computer storage media includes, but is not limited to, RAM, ROM, EE-PROM, flash memory or other memory technology, CD-ROM, digital versatile disks (DVDs) or other optical storage, magnetic cassettes, magnetic tape, magnetic disk storage or other magnetic storage devices, or any other medium that may be used to store the desired information and that may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing de vice BOO may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

Aspects of the present disclosure may be practiced in conjunction with a virtual machine and a host for virtualizing computing resources, which may be referred to herein as a hypervisor. Program data 824 may comprise instructions for executing a hypervisor which may host one or more virtual machines simulating direct access to physical components such as processor 804, system memory 806, output devices 842, and so on. Operating system 820 may execute by instructions performed by a virtual processor simulated by a hypervisor. A hypervisor may serve as an intermediary between operating system 820 and physical components such as processor 804 and memory controller 818. A hypervisor may, for example, be configured to receive core and router operating frequencies from a memory associated with processor 804.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such latent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, 8, and C, etc." is used, in general, such, a construction is intended in the sense that one having skill, in the art would understand, the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least, one of A, B, or C, etc." is used, in general such a construction is intended in the sense one having skill in the art would understand the convention, (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such, as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A system, comprising:
   a processor comprising a plurality of cores, a plurality of routers, and one or more memory controllers communicatively coupled to the plurality of cores by the plurality of routers, wherein the one or more memory controllers and the plurality of routers are coupled in a network configuration for communication between the one or more memory controllers and the plurality of cores, and wherein the plurality of routers are interconnected to form a plurality of paths from the plurality of cores to the one or more memory controllers; and
   a component configured at least to perform or control performance of operations that comprise:
      assign a first priority to a first core of the plurality of cores, wherein assignment of the first priority to the first core is based at least, in part, on a first determination that all routers in at least one path between the first core and at least one memory controller, of the one or more memory controllers, are operable at a first frequency;
      assign a second priority to a second core of the plurality of cores, wherein assignment of the second priority to the second core is based at least, in part, on a second determination that all paths between the second core and a memory controller, of the one or more memory controllers, comprise at least one router with a maximum operable frequency less than the first frequency, and wherein the second priority is lower than the first priority;
      assign a first thread to execute on the first core based on the assigned first priority and second priority to the first core and the second core respectively;
      assign a second thread to execute on the second core based at least, in part, on a determination that the first core is unavailable to execute the second thread; and
      cause an unassigned core of the plurality of cores to enter a sleep state, based at least, in part, on the second determination.

2. The system of claim 1, wherein the operations further comprise:
   cause a router of the plurality of routers to enter a sleep state based at least, in part, on an additional determination that a maximum operable frequency of the router to be caused to enter the sleep state is less than the first frequency.

3. The system of claim 1, wherein the operations further comprise:
   determine to assign an additional thread to execute on a core other than the first core, based at least, in part, on a maximum operable frequency of the first core.

4. The system of claim 1, wherein the operations further comprise:
   determine to assign an additional thread to a core other than the first core, based at least, in part, on a cache miss rate of the additional thread being above a threshold value.

5. The system of claim 1, wherein the operations further comprise:
   calculate a priority value for the first core based at least, in part, on an operable frequency of the first core, an operable frequency of a router nearest to the first core, and a minimum operable frequency of the routers on the at least one path to the at least one memory controller, wherein the priority value corresponds to the first priority.

6. The system of claim 5, wherein the operations further comprise:
assign a first additional thread to execute on the first core, wherein assignment of the first additional thread is based at least, in part, on the priority value and an additional determination that a cache miss rate of the first additional thread is above a threshold; and
assign a second additional thread to execute on the second core, wherein assignment of the second additional thread is based at least, in part, on the additional determination that the cache miss rate of the first additional thread is below the threshold.

7. The system of claim 1, wherein the component includes an operating system or a hypervisor.

8. The system of claim 1, wherein the operations further comprise:
determine a priority of a memory controller, of the one or more memory controllers, based at least, in part, on the first determination; and
steer data, based on the priority of the memory controller, to a memory accessible to the memory controller.

9. A non-transitory computer readable storage medium that includes executable instructions stored thereon that, in response to execution by a computation device, cause the computation device to perform or control performance of operations that comprise:
assign a first priority to a first core of a plurality of cores of a processor, wherein assignment of the first priority to the first core is based at least, in part, on a first determination that all routers in at least one path between the first core and at least one memory controller, of one or more memory controllers of the processor, are operable at a first frequency, wherein the processor comprises a plurality of routers that are arranged in a network configuration for communication between the one or more memory controllers and the plurality of cores, and that are interconnected to form a plurality of paths from the plurality of cores to the one or more memory controllers;
assign a second priority to a second core of the plurality of cores, wherein assignment of the second priority to the second core is based at least, in part, on a second determination that all paths between the second core and a memory controller, of the one or more memory controllers, comprise at least one router with a maximum operable frequency less than the first frequency, and wherein the second priority is lower than the first priority;
assign a first thread to execute on the first core based on the assigned first priority and second priority to the first core and the second core respectively;
assign a second thread to execute on the second core based at least, in part, on a determination that the first core is unavailable to execute the second thread; and
cause an unassigned core of the plurality of cores to enter a sleep state, based at least, in part, on the second determination.

10. The non-transitory computer readable storage medium of claim 9, further comprising instructions stored thereon that, in response to execution by the computation device, cause the computation device to perform or control performance of at least one operation that comprises:
determine to assign an additional thread to execute on a core other than the first core, based at least, in part, on a maximum operable frequency of the first core.

11. The non-transitory computer readable storage medium of claim 9, further comprising instructions stored thereon that, in response to execution by the computation device, cause the computation device to perform or control performance of at least one operation that comprises:
evaluate information indicative of operable frequencies of routers on a path from the first core to the at least one memory controller.

12. The non-transitory computer readable storage medium of claim 9, further comprising instructions stored thereon that, in response to execution by the computation device, cause the computation device to perform or control performance of at least one operation that comprises:
calculate a priority value for the first core based at least, in part, on an operable frequency of the first core, an operable frequency of a router nearest to the first core, and a minimum operable frequency of the routers on the at least one path to the at least one memory controller, wherein the priority value corresponds to the first priority.

13. The non-transitory computer readable storage medium of claim 9, further comprising instructions stored thereon that, in response to execution by the computation device, cause the computation device to perform or control performance of at least one operation that comprises:
assign an additional thread to execute on the first core, wherein the assignment of the additional thread is based at least, in part, on the first priority and an additional determination that a cache miss rate of the additional thread is above a threshold.

14. The non-transitory computer readable storage medium of claim 9, further comprising instructions stored thereon that, in response to execution by the computation device, cause the computation device to perform or control performance of at least one operation that comprises:
assign an additional thread to execute on the second core in response to a determination that a cache miss rate of the additional thread is below a threshold and in response to determination that a maximum operable frequency of the second core is greater than a maximum operable frequency of the first core.

15. The non-transitory computer readable storage medium of claim 9, further comprising instructions stored thereon that, in response to execution by the computation device, cause the computation device to perform or control performance of at least one operation that comprises:
associate a memory for the first thread with a physical page frame served by a particular memory controller, wherein the particular memory controller is selected based at least, in part, on the first determination.

* * * * *